No. 612,725. Patented Oct. 18, 1898.
J. T. HASKIN.
LIFTING JACK.
(Application filed July 28, 1897.)
(No Model.)
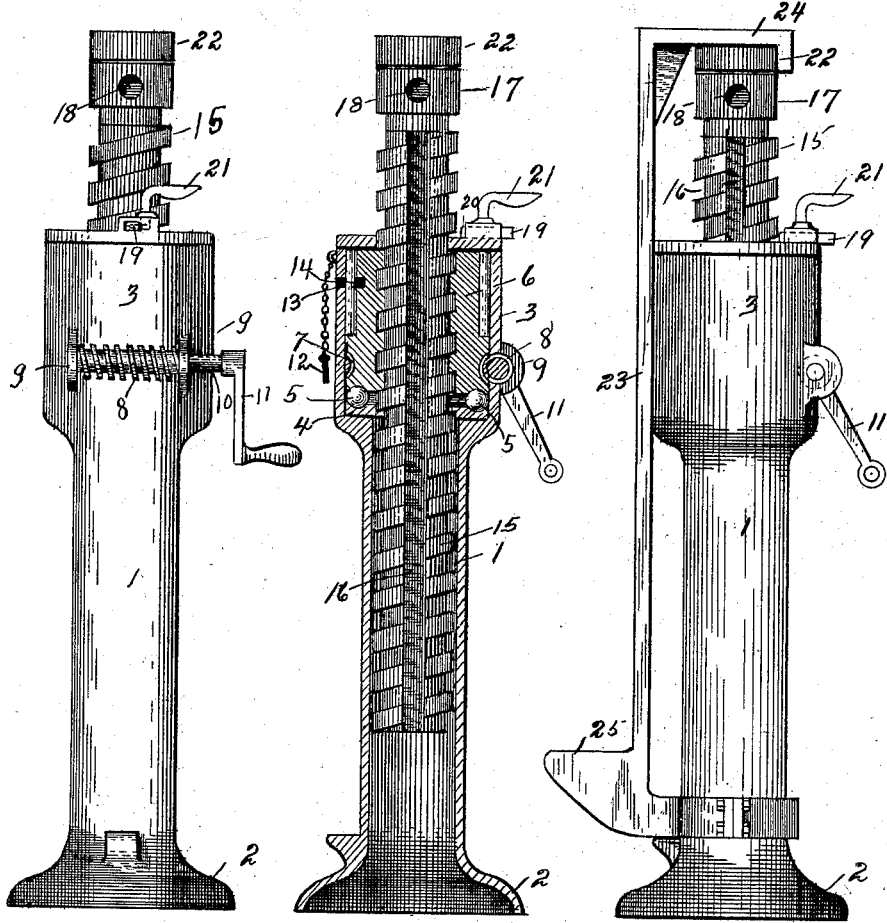
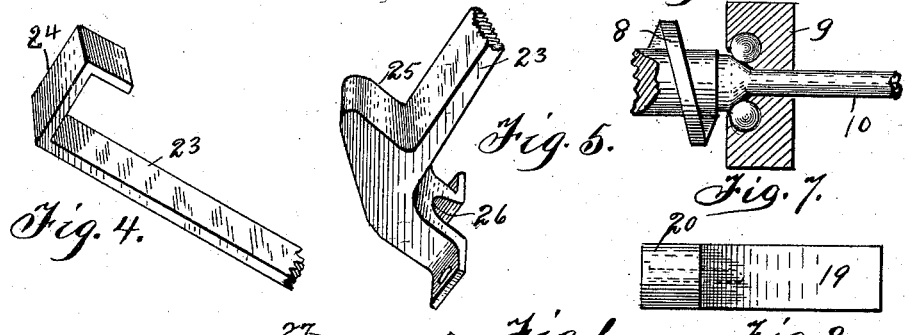
Witnesses
Frank H. Fright.
W. H. Timmerman
Inventor
John T. Haskin
By
Henry C. Evert, Attorney

UNITED STATES PATENT OFFICE.

JOHN T. HASKIN, OF McKEE'S ROCKS, PENNSYLVANIA.

LIFTING-JACK.

SPECIFICATION forming part of Letters Patent No. 612,725, dated October 18, 1898.

Application filed July 28, 1897. Serial No. 646,213. (No model.)

*To all whom it may concern:*

Be it known that I, JOHN T. HASKIN, a citizen of the United States of America, residing at McKee's Rocks, in the county of Allegheny and State of Pennsylvania, have invented certain new and useful Improvements in Lifting-Jacks, of which the following is a specification, reference being had therein to the accompanying drawings.

This invention relates to certain new and useful improvements in lifting-jacks, and has for its object to construct a device that can be operated by a crank-handle and worm-gear turning a nut which elevates the screw, or the ordinary bar may be used to turn the screw, and the supporting-screw is made stationary by any well-known means, and further aims to construct a device which will be easy to operate, light, strong, and comparatively inexpensive to manufacture.

In describing the invention in detail reference is had to the accompanying drawings, forming a part of this specification and wherein like figures of reference indicate similar parts throughout the several views, in which—

Figure 1 is a side view of my improved jack. Fig. 2 is a sectional view of the same. Fig. 3 is a side view showing an auxiliary attachment. Fig. 4 is a perspective view of the upper part of the auxiliary attachment. Fig. 5 is a perspective view of the lower part of the auxiliary attachment. Fig. 6 is a perspective view of the collar for securing the auxiliary attachment in position. Fig. 7 is a view showing one end of the worm-gear. Fig. 8 is a top plan view of the stop-catch.

Referring now to the drawings, 1 designates the hollow body portion of the jack, having a flared portion 2, forming the foot, and the enlarged portion 3, forming a seat for the operating mechanism. Mounted in said enlarged portion is a plate 4, having a groove forming a ball-race to receive the balls 5. Resting on said balls is a screw-threaded nut 6, provided on its lower face with a groove forming the remainder of the ball-race to receive the balls 5.

Formed on the periphery of the nut 6 are teeth 7, engaging a worm-gear 8, journaled in lugs 9 9, formed integral with the enlarged portion 3. Said worm-gear is provided with an extension 10 to receive a handle 11. Secured to the enlarged portion 3 in any suitable manner is a plug 12, adapted to pass through the opening 13 and engaging the opening 14 of the nut 6 to prevent the same from turning. Operating through the internally-screw-threaded nut is a screw 15, provided with a longitudinal slot 16. Secured to the upper end of the screw is a head 17, provided with openings 18 to receive an operating-bar. (Not shown.) Above said head is a rotatable head 22. Operating in the longitudinal slot 16 is a catch 19, carrying on one end a roller 20 to reduce friction. Said catch 19 is held either in or out of engagement with the screw 15 by the set-screw 21.

In Fig. 3 I have shown an auxiliary attachment consisting of a shank 23, provided at its upper end with an arm 24, engaging the head 22. At or near the lower end of the shank 23 is a projection 25, serving as a support for the weight to be raised. The lower end of the shank is provided with a cut-away portion 26, conforming to the shape of the body of the jack, and is held in engagement with the jack by means of a collar 27, which is secured to the shank 23 by screw-bolts or any suitable means.

The operation is as follows: The weight to be raised rests on the head 22. The end 20 of the catch engages the longitudinal slot 16 of the screw 15, preventing it from turning. The crank-handle 11 is operated, turning the nut 6, which forces the screw upward. When it is desired to operate the screw by a bar, the plug 12 is placed in the hole 13, the end of the plug engaging the opening 14 in the nut 6, preventing the same from turning, and by placing the bar in the opening 18 and turning the screw to the left it will elevate the object to be raised.

Having fully described my invention, what I claim as new, and desire to secure by Letters Patent, is—

An improved lifting-jack, consisting of a hollow frame provided at its upper end with an enlarged portion, a nut operating in said enlarged portion and provided on its periphery with teeth, a worm-gear journaled in lugs formed integral with the outside of the frame, said worm-gear engaging the teeth to turn the nut, a screw provided with a longitudinal slot operating through said nut, a head secured to the top of said screw, a rotatable head mounted in the stationary head, a catch secured to the casing to engage the longitudinal slot to prevent the screw from turning when the same is raised by turning the nut, and means for preventing the nut from turning when the screw is raised by turning the same, substantially as shown and described.

In testimony whereof I affix my signature in presence of two witnesses.

JOHN T. HASKIN.

Witnesses:
JOHN NOLAND,
THOS. M. BOYD, Jr.